June 6, 1944. W. GRUNBERG 2,350,351
APPARATUS FOR INSTRUCTING AND TRAINING STUDENT OPERATORS
Filed March 5, 1940 4 Sheets-Sheet 1
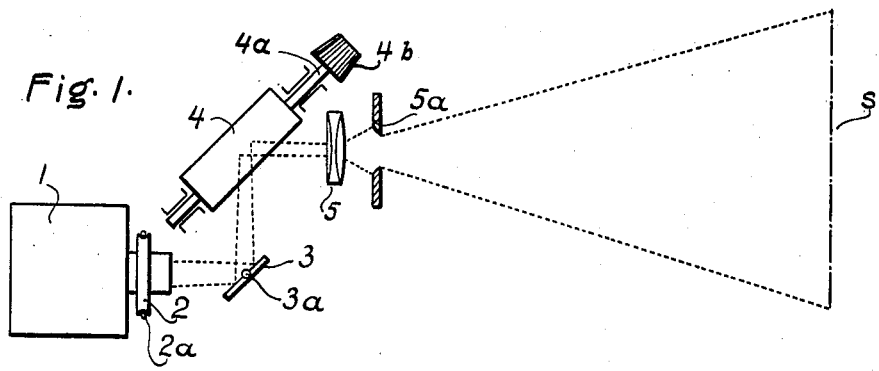
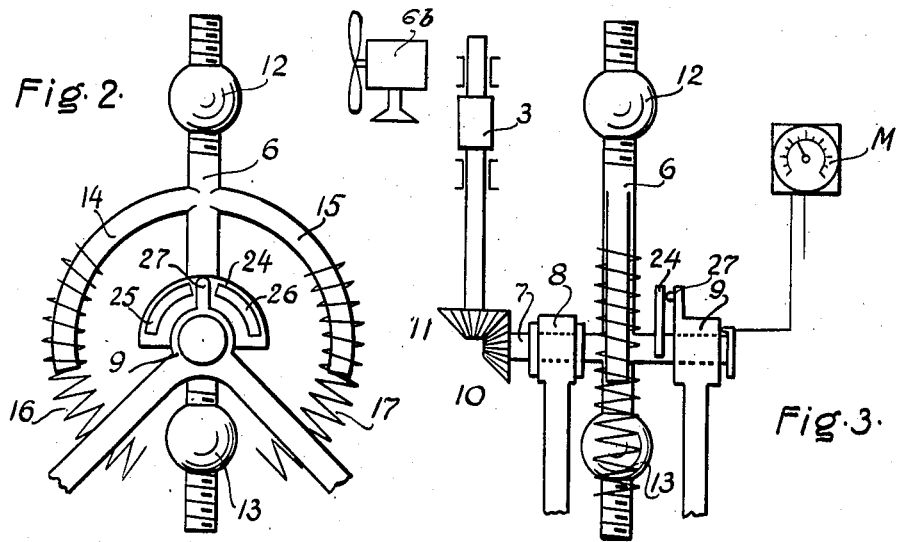
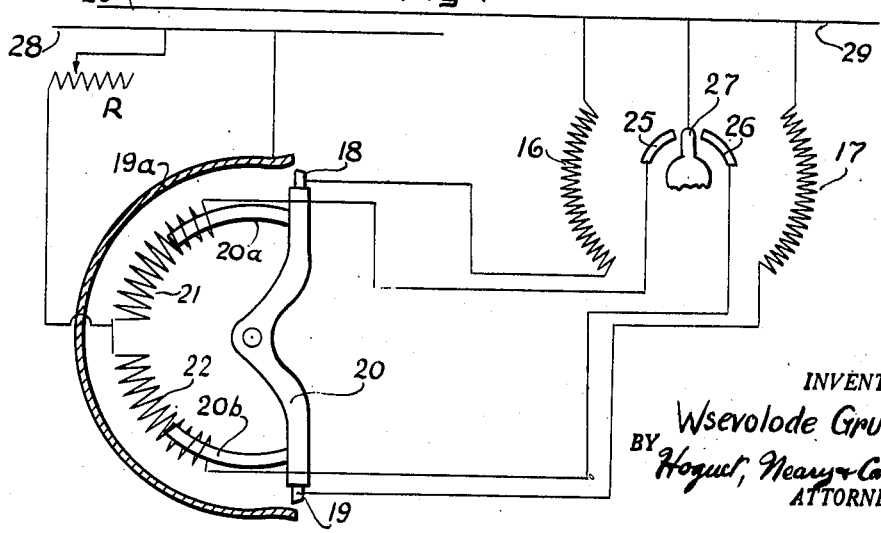
INVENTOR.
Wsevolode Grunberg
BY Hoguet, Neary & Campbell
ATTORNEYS.

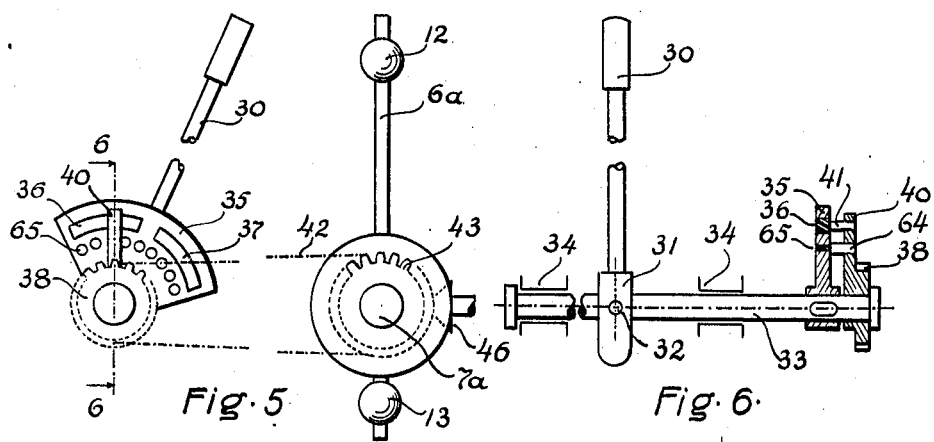
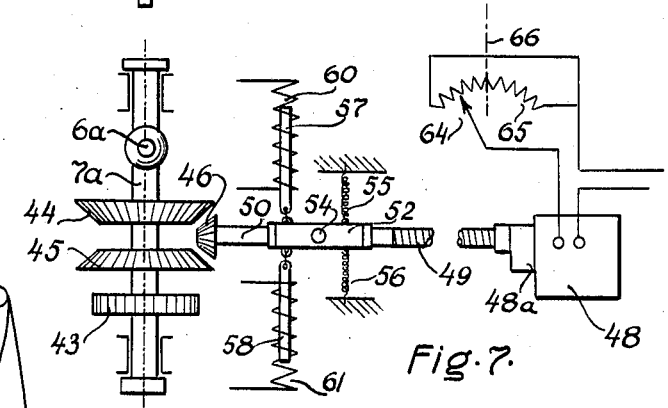
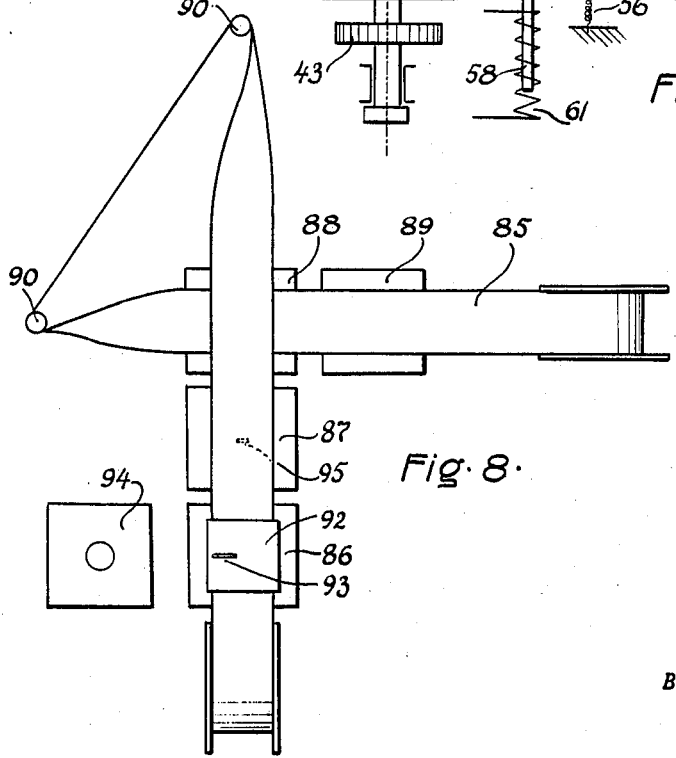

June 6, 1944. W. GRUNBERG 2,350,351
APPARATUS FOR INSTRUCTING AND TRAINING STUDENT OPERATORS
Filed March 5, 1940  4 Sheets-Sheet 3

INVENTOR.
Wsevolode Grunberg
BY Hoguet, Neary & Campbell
ATTORNEYS.

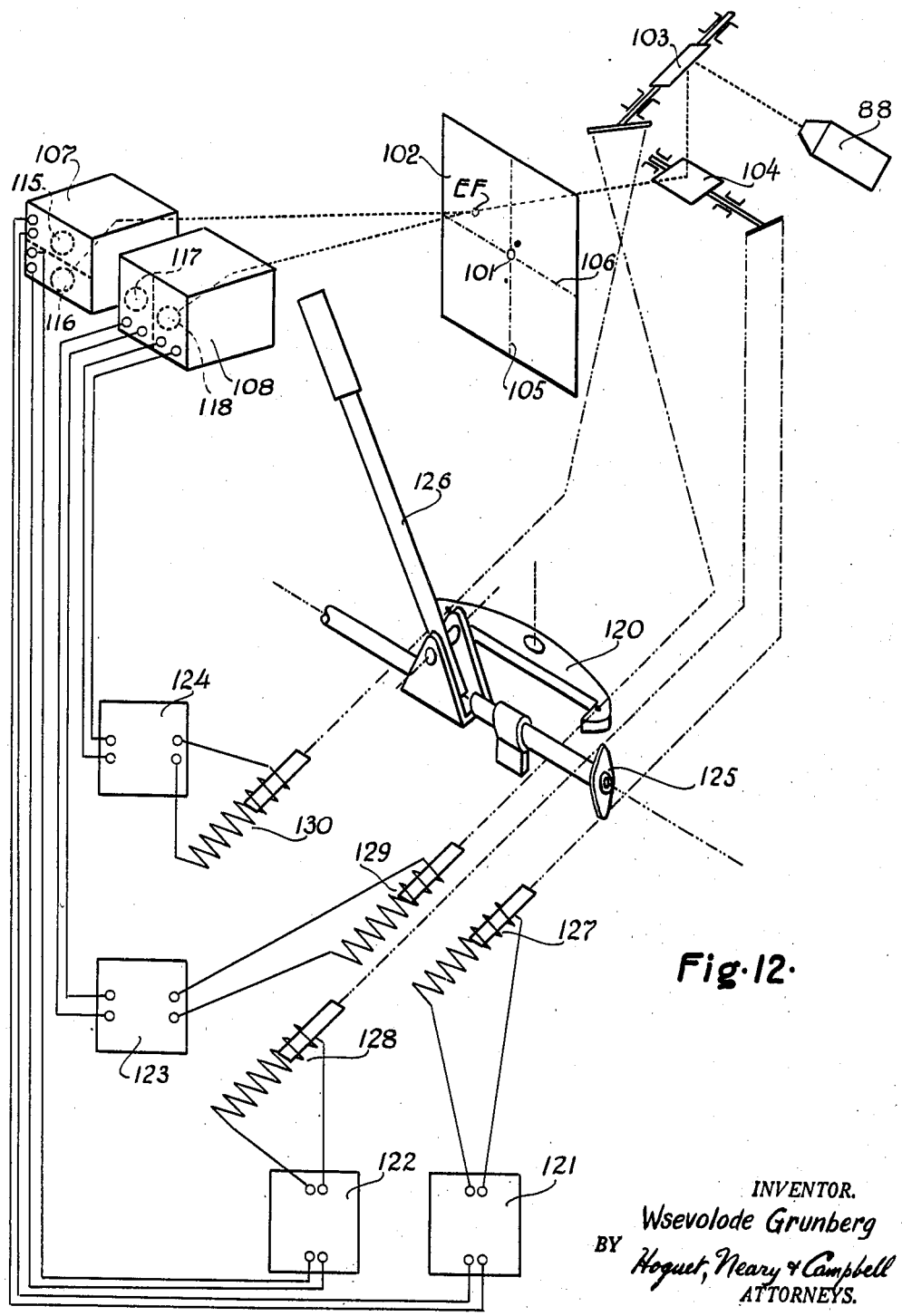

Patented June 6, 1944

2,350,351

UNITED STATES PATENT OFFICE 2,350,351

APPARATUS FOR INSTRUCTING AND TRAINING STUDENT OPERATORS

Wsevolode Grunberg, Montreal, Quebec, Canada

Application March 5, 1940, Serial No. 322,289

30 Claims. (Cl. 35—12)

This invention relates to apparatus for use in instructing and training student operators so as to instill in the students knowledge and responsiveness for manipulating the controls of operable means such as machines and devices of various kinds requiring in their normal or in desired operations the coordinated operation of a plurality of controls and which tend to pass into a state of undesired operation unless the controls thereof are continuously monitored.

In controlling the condition or operation of various machines and in systems controlling the steps of various processes, it is important that the operator become thoroughly familiarized with the operation of the controls before undertaking charge. This is particularly important in operating or piloting machines, such as airplanes, where several controls must be manipulated in coordination to produce desired operations or maneuvers.

Referring further to airplanes by way of illustration, it is well known that airplanes are adapted to be maneuvered about three axes, the longitudinal, the transversal and the normal. These movements may be effected by the pilot mainly through manipulation of the ailerons, the elevator and the rudder, respectively, the first two being controlled by a joystick which operates on a universal joint and the third by a rudder bar. In maneuvering the airplane the pilot must coordinate the movements of the stick and rudder bar to effect the desired maneuvers.

Devices have been heretofore constructed for preliminary ground training and testing of pilots, such as by providing a dummy cockpit supported by a kind of universal joint which enables the cockpit to assume different positions. The stability of the cockpit is usually influenced by external forces compelling the student to manipulate the controls so as to maintain the cockpit in a given position. This type of training device, however, depends on the presence of an instructor and also upon the student's feeling of equilibrium which, under some circumstances, is misleading. Other training devices heretofore proposed have been provided with instruments, but these do not teach the student how to manipulate the controls; they aid him in practicing after he has once learned the proper manipulation of the controls.

While these prior devices were intended to aid students in practicing control manipulation, none of them teaches or shows a learner how to manipulate the controls nor how to effect desired maneuvers.

It is therefore an object of my invention to provide improved means not only to provide practice for a student but to also provide positive assistance to show students how to manipulate the controls in response to various conditions.

Another object of my invention is to provide means for use in instructing and training student operators in various phases of training, so as to instill in students a thorough knowledge of control manipulation and a responsiveness to act spontaneously in manipulating the controls.

Another object of my invention is to provide a simple and relatively inexpensive means for instructing and training students in the art of manipulating a plurality of coordinatable controls of operable means such as machines and devices of various kinds.

Additional objects and features of the invention comprise the provision of means for indicating to the student the proper manipulation of the controls; the provision of means for simulating actual operating conditions of a machine or device to which students may respond and thereby familiarize themselves with the feel and control of the machine or device as in actual practice; and the provision of means for indicating or recording the responsiveness of the student.

The foregoing objects and others ancillary thereto are accomplished by my invention by simulating the operation of a machine or of a process control system or other device by employing an object or a visual representation of an object which reacts or appears to react in accordance with the operation or condition of the machine or of the controls of the machine or process being controlled, or a representation or image of the machine itself or of instruments associated therewith. The controls or instruments may be represented by individual spots or images, such as arrows or the like, the positions of which indicate the positions of the controls or the readings of the instruments, as the case may be. Two or more movements or instrument readings may be combined in one image or spot, such as producing an apparent movement of the landscape in respect to an airplane maneuvering about its normal, transversal and longitudinal axes. Instead of the image of a landscape, a cross-lined grating may be used to produce a representation of rotation and movement in vertical and horizontal directions.

This representation may be accomplished in several ways, either mechanically or electrically, such as by using lamps and switches or by use of a cathode ray tube or by optical means, to name but a few. Where optics are employed, the spot or other image or images representing the operations or conditions of the machine or process or of the instruments associated therewith which would be observable to the operator may be projected by means of one or more projection elements upon a screen in view of the student. One or more of the projection elements may be arranged for movement to simulate operations or conditions of the controls or of the machine or process.

The movement of the projection elements may be subject to variable external forces or to a determined series of forces. The student, in order to maintain the object stationary or in a predetermined condition, must operate his controls which are operatively associated with the projection elements to effect the desired movement of the projection elements as well as to offset or overcome the influence of external forces. The rate of movement or the degree of control of the projection elements, of course, may be varied depending on the stage of instruction for which the exercise is intended.

The electronic beams of the cathode ray tube having properties identical to light beams can be reflected, deflected and focused the same as light beams. It is therefore to be understood that what is stated in connection with optics and light beams also follows for the cathode ray tube and electronic beams, the apparatus associated with the cathode ray tube being varied in accordance with the characteristics thereof.

The apparatus may also be provided with means which may be used to impose a force upon the controls in response to the movement of the object away from normal position, thereby teaching and helping the student to make the proper manipulations. This feature of my invention may even be applied to the controls of the machine or process for automatic operation. Referring to airplane operation, the means responsive to movement of the machine or its instruments may be arranged to operate upon such elements as the rudder, ailerons, elevators, throttle, etc., to automatically maintain the plane in correct flight.

Images representing instruments associated with the machine or process may be projected upon the screen to indicate actual conditions thereof during a recorded or determined series of manipulations or operations. This may also be supplemented by the projection of objects such as spots upon the screen to represent the conditions or positions of the controls or the result of the operation of the controls.

The supplemental projections may also be utilized by means of photoelectric cells to impose forces upon the controls to teach the student the proper manipulation of the controls for particular maneuvers, or for stabilizing the machine when it is subjected to various disturbances. Projection elements may also be provided for controlling the projected images in response to manipulation of the controls so as to indicate the correctness and responsiveness of the student. The responsiveness of the student may also be checked by suitable metering means.

The projection devices may also be provided with sound recordings to explain the maneuvers projected and/or to furnish audible signals when the controls are not properly manipulated, or to simulate radio signals.

The above and other objects and features of the invention will become apparent upon considering the following description when taken in connection with the accompanying drawings, in which:

Fig. 1 is a diagrammatical view in plan of one form of apparatus having a plurality of projection elements which may be used to project upon a screen a movable image of such size and character as to be capable of assuming different orientations on said screen to simulate the movement of a machine, such as an airplane, or the landscape relative to the airplane or the indications of one or more instruments, or to give signals indicating control manipulations;

Fig. 2 is a view in vertical elevation of a deviating device which may be connected to one of the projection elements of Fig. 1;

Fig. 3 is a view of the left-hand side of the device shown in Fig. 2;

Fig. 4 is a schematic illustration of the connections between a manual control such as the usual rudder bar of an airplane and the electromagnetic coils of the device shown in Figs. 2 and 3;

Fig. 5 shows another form of deviating means operatively associated with a manual control, such as a joystick of an airplane;

Fig. 6 is a vertical sectional view taken along line 6—6 of Fig. 5;

Fig. 7 is a plan view of the deviating means illustrated in Fig. 5 showing a power drive for controlling the movement thereof;

Fig. 8 illustrates diagrammatically a further form of apparatus for projecting images upon a screen to simulate the function of various instruments and results of control operations;

Fig. 12 is a diagrammatical illustration of the apparatus indicating the coactive relation of the elements and means for imposing forces upon the controls, in accordance with maneuver indications on the screen.

Figure 9:
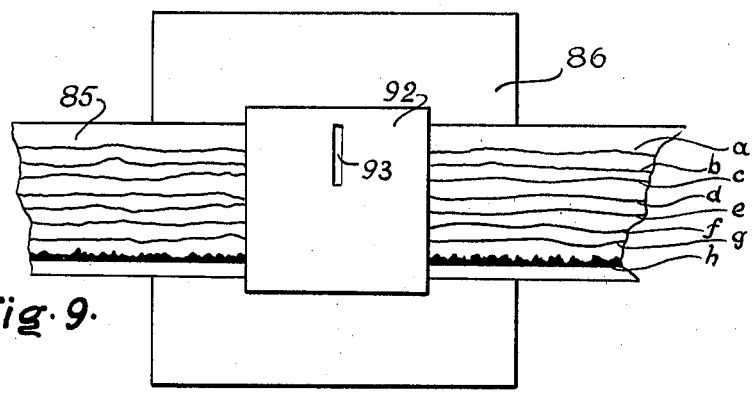
Fig. 9 is a fragmentary view of a part of the apparatus shown in Fig. 8 at an enlarged scale.

One form of apparatus by which the principles of my invention may be practiced for instructing and training students to operate or pilot machines, such as airplanes, is diagrammatically illustrated in Figs. 1 to 4 of the drawings. The apparatus comprises a lantern 1 adapted to project a beam of light through a diapositive 2 containing an image, such as that of the landscape viewed from an airplane, against a mirror 3 mounted for movement about a vertical axis 3a. The mirror 3 is adapted to reflect the beam of light toward a mirror 4, which is pivotally mounted on an axis 4a transverse to the axis 3a and controlled through a gear 4b. The mirror 4 reflects the beam of light through a suitable lens 5 and window 5a upon a screen S. The diapositive 2 is adapted to be revolved in its plane by a suitable connection 2a while the mirrors 3 and 4 are adapted to be rotated back and forth about the axes 3a and 4a, respectively.

From the foregoing description it will be apparent that the position of the image or landscape on the screen S will depend upon the relative positioning of the projection elements 2, 3 and 4. Movement of the mirror 3 controls the horizontal movement of the projected image to simulate the movement of the airplane or preferably of the landscape relative to an airplane as when the rudder of the airplane is actuated, or the airplane is subjected to transversal disturbances. Movement of the mirror 4 about the axes 4a produces a movement of the projected landscape in a vertical direction, an effect normally produced by operation of the elevator of the airplane or by the forces of vertical disturbances. The rotation of the diapositive 2 effects a rotation of the projected landscape simulating the effect of an airplane banking or rotating about its longitudinal axis. The image projected upon the screen may thus be caused to rotate and move in all directions upon the screen, depending upon the movements of the projection elements 2, 3 and 4.

In order to produce unpredictable movements for the projected image, the elements 2, 3 and 4 may each be operatively associated with a deviatable device having unstable equilibrium. This effect of the deviatable devices upon the projection elements may thus be advantageously utilized to produce unpredictable effects simulating disturbed flight which the student is required to correct. Controls characteristic of the training device may be provided to have an operative effect or control over the deviatable devices so that the student, by proper manipulation, can return the devices to their vertical or neutral positions. For example, the means 2a which controls the movement of the diapositive 2 may be operatively associated with the joystick so that it can be influenced by operation of the stick similarly as would be the ailerons of an airplane. The device controlling the mirror 4 would also be associated with the stick to simulate operation of the elevator of the airplane and the device controlling the mirror 3 would be associated with the rudder bar to simulate rudder control. Any suitable means, such as an oscillating fan 6b producing air movements or other means may be provided to cause the deviatable devices to move from neutral position, whereupon further movement will be caused by action of gravity or by power controlled means.

Referring to Figs. 2 and 3, a form of deviating device is shown comprising a rod-shaped member 6 which is provided with a shaft 7 disposed transversely thereof and supported in suitable bearings 8 and 9. The shaft 7 is provided with a bevel gear 10 which is adapted to mesh with a bevel gear 11 operatively connected to the mirror 3. The rod 6 may be threaded at both ends for receiving weights 12 and 13 by which the center of gravity may be adjusted relative to the axis of the shaft 7. The rod 6, to represent correct operating condition, should be in a vertical position. In order to return or maintain the rod 6 in a vertical position, the rod is shown provided with a pair of oppositely disposed arcuately shaped arms 14 and 15. These arms are associated with solenoids 16 and 17, which when properly energized are adapted to magnetically urge the rod toward vertical position. The energizations of the solenoids 16 and 17 is in turn controlled by manipulation of the control which in the case of the mirror 3 would be the rudder bar.

The connections for the solenoids 16 and 17 are shown in Fig. 4 connected to a rudder bar 20, whereby the deviatable rod 6 is adapted to be returned toward vertical position upon proper manipulation of the bar. The bar 20 is provided with electrical brush contacts 18 and 19 at the extremities thereof for brushing engagement with an arcuately shaped stationary contact 19a. The circuits thus completed are adapted to energize one or the other of the solenoids 16 and 17, depending on the operation of the rudder bar 20. Should the rod 6 move out of vertical position the student may by operating the rudder bar 20, energize either of the solenoids 16 or 17 to effect the return of the rod to vertical position. Since the movement of the rod 6 changes the position of the mirror 3 and therefore the position of the image projected upon the screen, the student may, by proper manipulation of the rudder bar, return and maintain the rod 6 in vertical position, thereby stabilizing this component of the control over the projected image.

The operation of the apparatus thus described produces effects simulating airplane flying conditions, it being understood that the joystick is associated with two deviatable devices, such as the rods 6, one operatively connected to the diapositive 2 and the other to the mirror 4. Thus the student observing the image on the screen must act, whenever the image starts to rotate or move out of a state of equilibrium due to the influence of the deviatable devices upon the diapositive 2 and the mirrors 3 and 4, by manipulating the stick and rudder bar to effect the return of the image to a normal determined condition. Practice with this form of the invention enables students to improve their responsiveness to operate the controls. In the case of beginners, however, it is desirable to provide means to indicate the proper manipulation by imposing forces on the controls, in response to movements of the projected image.

Referring to Figs. 2, 3 and 4, the rod 6 is shown provided with a sector 24 having electrical contacts 25 and 26 which are adapted to engage a stationary brush 27 as the rod deviates to the left or right from the vertical position, as viewed in Fig. 2. The rudder bar is provided with two arcuate arms 20a and 20b operatively associated with solenoids 21 and 22, respectively. The solenoids 21 and 22 are connected to a lead 28 of a source of electric power through a rheostat R, while the brush 27 is connected to the opposite lead 29. By this arrangement the bar 20 is adapted to be subjected to an electromagnetic force in the direction the control should be moved. The force thus applied is of the nature of a dual flight instruction. The force, however, may be varied by the rheostat R so as to be suggestive only or of sufficient strength to produce automatic control operation.

The application of a force opposite to the proper control movement, such as sometimes experienced in actual flight, may be obtained by interchanging the electrical connections. This opposing force gives the student the feel of resistance to control manipulation.

Bearing in mind that the diapositive 2 and each of the mirrors 3 and 4 are more or less similarly controlled by deviatable devices, such as the rod 6, the operation of the apparatus may be outlined as follows. With the student sitting in a cockpit before the screen 7, a projected image of the landscape may be caused to simulate a landscape such as viewed from an airplane in a disturbed flight. The unpredictable movements of the deviatable devices, however, operates through brushes 27 and the associated contacts to impose force upon the controls in directions to maintain stable flight, thereby teaching the beginner the proper control manipulations for overcoming various disturbances. As the beginner learns the proper method of control manipulation, the strength of the imposed forces may be decreased and even reversed so as to better simulate the resistance to control manipulation experienced in solo flight.

In order to check the responsiveness of a student, a suitable metering device M may be associated with each deviatable device, such as illustrated in Fig. 3, so as to record the time each device is permitted to remain beyond a given deviation, thereby furnishing the trainer a record of the precision and rapidity of the student's reactions.

Where it is desirable to control the rate of movement of the deviatable devices, power means may be provided. By utilizing power control, the gravitational movement of the deviatable devices may be controlled. It is also possible to vary the speed of movement of the deviatable devices in proportion to the degree of movement of the controls, thereby giving more nearly the same effect as experienced in actual flight.

This feature is shown in Figs. 5 to 7 associated with a joystick 30. The stick 30 is diagrammatically illustrated for operation with a universal connection at 31 whereby control of the ailerons and elevator may be effected. For brevity, only the connecting mechanism to the shaft 33 will be described, the principle of operation being the same for both the aileron and the elevator and likewise in controlling the rudder by the rudder bar.

The shaft 33 is mounted in suitable bearings 34 and carries a sector 35 which is provided with two segmental contacts 36 and 37, which may be adjustable, if desired. Rotatably mounted on the shaft 33 is a gear 38 connected to a lever 40. The lever 40 is provided with a brush 41 which is adapted to engage the segmental contacts 36 and 37 to complete certain controlling circuits, depending upon the relative positions of the stick and the deviatable device 6a. The device 6a is provided with a gear 43 which may be operatively connected to the gear teeth 38 by an endless chain 42, or if desired, the gears 43 and 38 may be brought together for direct meshing engagement. To control the movement of the deviatable device 6a a pair of spaced, oppositely disposed bevel gears 44 and 45 are operatively connected to the shaft 7a. A bevel gear 46 driven by a motor 48 is adapted to be shifted to engage one or the other of the gears 44, 45, depending on the direction in which the device 6a moves from vertical or neutral position. The drive between the motor 48 and the bevel gear 46 comprises reduction gearing 48a, a flexible shaft 49, a rigid shaft 50 and a sleeve 52. The sleeve, which is pivoted at 54, rotatably supports the shaft 50. The bevel gear 46 is maintained in a neutral position between the bevel gears 44 and 45 by oppositely opposed springs 55 and 56 attached to the sleeve 52. The sleeve 52 is also provided with a pair of iron cores 57, 58, which are operatively associated with solenoids 60 and 61, electrically connected to the contacts 36 and 37 respectively, similarly as illustrated in connection with deviatable device 6 in Figs. 2, 3 and 4.

The motor 48 may be continuously energized to provide a continuous rotation of the gear 46. When the device 6a is caused to move out of vertical position, the brush 41 is brought into engagement with one of the segments 36 or 37, thereby closing a circuit to one or the other of the solenoids 60 and 61, depending on the direction of movement of the device 6a. As soon as one of the solenoids 60 or 61 is energized, the gear 46 is moved to engage the corresponding one of the gears 44 or 45 to thereby control the further movement of the device in its movement away from vertical position. Thus, as soon as the device leaves vertical position, it is brought under control of the gear 46 and caused to move in accordance with the speed of the motor 48. The movement of the deviatable device being under control of the motor 48, the speed thereof may be arranged to be very slow, and if desired may be accelerated in speed the further it is permitted to move from vertical position. This latter effect may be accomplished by providing the lever 40 with an additional brush 64 for engagement with a series of rheostat contacts 65 carried on the sector 35. The rheostat contacts 65 are diagrammatically illustrated in Fig. 7, indicating that the electric power to the motor 48 is increased as the brush is moved relative to the left or right of the center 66 of the rheostat 65.

In operation, should the device 6a be caused to deviate from vertical position, the lever 40 would be moved proportionally completing a solenoid circuit by brush engagement with either contact 36 or 37, as the case may be. This causes the gear 46 to engage the proper gear 44 or 45 to continue the movement of the device 6a under power of the motor 48. The movement of the bruth 64 in passing over the rheostat contacts 65 controls the current to the motor so as to accelerate the movement thereof the further the brush 65 moves relative to the rheostat center 66. To return the device 6a to vertical position and thereby maintain the projected image in proper position on the screen, the stick 30 must be moved in the reverse direction sufficiently to effect a reversal of the driving engagement of the gear 46. Should this corrective movement of the stick be exaggerated, the brush 64 will be moved beyond the rheostate center 66 to accelerate the return movement of the device 6a similarly as in the case of over actuation of the controls of an airplane. As the device 6a approaches vertical position, the stick 30 must be actuated to slow the correcting movement or the device will move beyond vertical position just as in airplane maneuvering. The affect of the stick operation on the deviatable device is conveyed to the student by his perception of the projected image of the landscape or other object, such as viewed by the aviator in actual flight, as well as by his perception of applied forces, such as disclosed in connection with the forms illustrated in Figs. 2 to 4.

Another embodiment of the invention is illustrated in Figs. 8 to 12, which is particularly suitable for instruction in complicated maneuvers. For example, students may, by use of this form of the invention, be instructed and familiarized with particular maneuvers or series of maneuvers, or even with the characteristics of a particular machine.

Briefly, recordings of the instrument readings and operations of the controls of a machine may first be recorded either in an actual operation, or by operation of a dummy machine or by artificial production, and in the case of aviation, the recording may be of the instruments during a particular flight.

These recordings may be utilized so as to project the same readings and indications upon a screen before a student. The projections may comprise an image of the particular instrument or an image of the instrument needle or a spot indicating instrument movements relative to instrument panel graduations. The projections may also include spots or images indicating one or more control operations or readings of instruments responding to one or more components of machine movement or condition. These latter spots would be for the most part an integration of two or more instrument readings. These projected spots may also be utilized by means of photoelectric cells to teach the student the proper control manipulation or feeling of control reaction by imposing forces on the controls similarly as in the form of Figs. 1 to 4, and later, as a means of checking the accuracy of the student in control manipulation in response to instrument readings only. The recording may also be provided with sound effects, radio signals, or verbal instructions.

Figure 10:
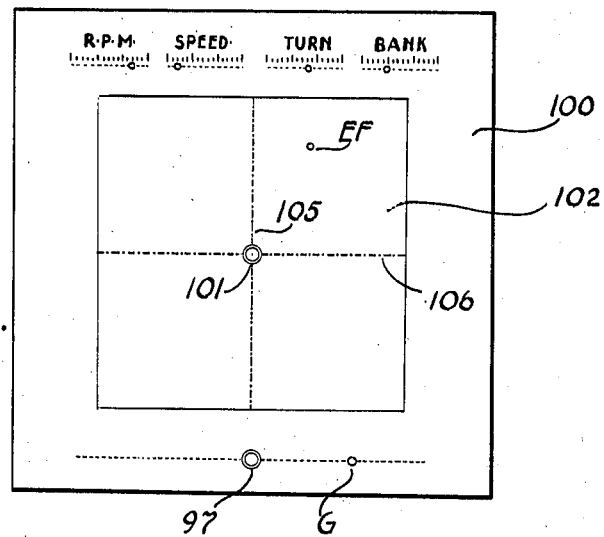
Fig. 10 is a diagrammatical view of a screen showing the projection of images simulating instruments and the conditions of the controls.
Figure 11:
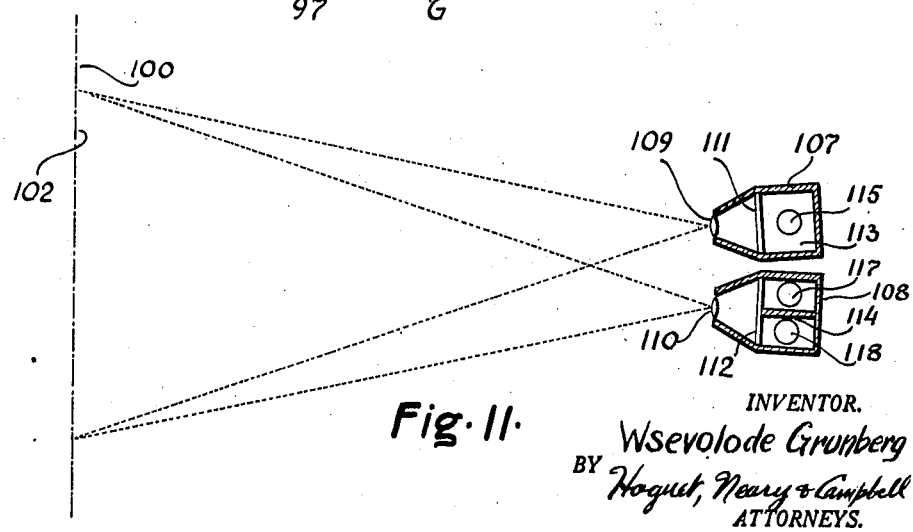
Fig. 11 illustrates diagrammatically a device which acts directly upon the controls in response to movements of certain of the projected images.

Referring to Figs. 8 and 9, the variable factors pertaining to instrument readings, etc., are first recorded on a film 85, preferably an opaque film with recordings in the form of translucent lines. The film having the recordings is adapted to be moved past a series of lanterns 86, 87, 88 and 89, the film being transposed by means of rollers 90 for double passage at right angles across the lantern 88. The recording of variables representing readings of various instruments as well as indications of control performances are indicated on the film 85 (Fig. 9) in the form of wavy lines. These translucent lines permit the passage of a beam of light for projection upon a screen. The beam of light may be controlled by a suitably shaped opening so as to project the many conditions of the recorded line as a movable spot or instrument needle. As shown in Fig. 9, a shutter 92 is provided with a narrow window 93 behind which four translucent lines a, b, c and d are adapted to pass. Each translucent line is adapted to provide for the projection of a spot upon the screen 100 representing the reading of an instrument, such as a tachometer, speedometer, turn indicator and bank indicator. Other instrument readings may also be added. The screen may be marked substantially as indicated in Fig. 10 to represent the graduation of these instruments or a separate lantern 94 may be provided to project such indications from a lantern slide. The spots depending on the waving characteristics of the lines a, b, c and d will be caused to move back and forth relative to the graduations of the indicated instruments. The three recorded lines e, f and g may represent variables corresponding to operation of the elevator, the rudder and the ailerons, respectively. The recording h, with which the lantern 89 is adapted to cooperate, may be a sound recording to provide verbal instructions as the exercise proceeds or to give sound effects ordinarily accompanying the particular maneuver, or they may comprise radio guide signals, if desired.

While the lanterns 86 to 89 are spaced apart, the different curves are so provided as to be projected by the lanterns in synchronism. The lantern 87 is provided with a window 95 to permit the projection of the characteristics of the line g in a linear dimension. Where desired, the window of a lantern may be moved to correspond with one of the variables, thereby providing a projection, the movement of which is bidimensional, each dimension corresponding to one variable. This may also be effected by intersecting two of the wavy lines representing two variables before a lantern, such as the lantern 88 (Fig. 8).

The screen 100 may be provided with a marking or the projection of a circle or other mark 97 which will, when the projected spot G coincides therewith, represent that the control is in proper position. Should the line g vary, the lamp 87 would then project the variations of the spot G in a linear dimension horizontally of the screen and relative to the circle 97. The movement of the spot G indicates to the student the movement expected of his control, the ailerons in this instance, which may be returned to the circle 97 by proper manipulation of the joystick. The position of the projected spot may be controlled by one or more mirrors, such as indicated in Figs. 1 and 12, suitably interposed somewhere between the source of lantern light and the screen, one of the mirrors being connected for operation in response to movement of the aileron control to offset variations in the projection of the spot G. Thus, as the spot G varies to the right or left of the circle 97, it would indicate that the aileron control is not in proper position.

The indications represented by the lines e and f are combined by intersecting the lines at right angles before the lantern 88. This produces a single spot EF, which may move in any direction from the circle 101 for movement in the area 102, which is divided into quadrants by the intersection of the lines 105 and 106. The control of the spot EF may be accomplished by providing two mirrors, such as 103 and 104 of Fig. 12, between the lantern 88 and the screen 100. Thus the student will be able by properly manipulating his controls to return or maintain the spot EF in the circle 101.

The controls of the student may be arranged to receive automatic forces in response to movements of the spots EF and G. A form of means for providing the automatic control actuating forces is diagrammatically illustrated in Figs. 11 and 12. Two cameras 107 and 108 are provided with lenses 109 and 110 focused upon the area 102 of the screen 100 over which the spot EF is adapted to move. The cameras 107 and 108 are each provided with a ground glass 111 and 112 and a partition 113 and 114, respectively, dividing the cameras into compartments to house a pair of photoelectric cells 115, 116 and 117, 118, respectively. Referring to the camera 108, each cell thereof views one-half of the screen, as determined by the line 105. The camera 107 being disposed at 90° with respect to the position of the camera 108, the cells thereof each views a half of the screen, as determined by the line 106.

Referring to Fig. 12, any movement of the spot EF to the left or right of the line 105 will be viewed by one or the other of the photoelectric cells of the camera 108. Likewise, any movement of the spot above or below the line 106 will be viewed by one or the other of the cells of the camera 107. The cells 115, 116, 117 and 118 of the cameras 107 and 108 are electromagnetically connected to controls, such as the rudder bar 120 and joystick 126 by suitable relays 121, 122, 123, and 124, and solenoids 127, 128, 129 and 130, respectively. As illustrated in Fig. 12, the rudder bar 120 is associated with the solenoids 129 and 130 and operatively connected by suitable means to the mirror 103. The elevator control 125 of the stick 126 is associated with the solenoids 127 and 128 and operatively connected by suitable means to the mirror 104. The projection lantern 88 may be arranged to project the spot resulting from the intersection of the recorded lines e and f upon the screen area 102 under control of the mirrors 103 and 104.

In operation of the apparatus, the recordings projected by the lantern 88 are viewed by the cells of the cameras 107 and 108 to automatically actuate the controls 120 and 126 and thereby return the spot EF to the circle 101 each time it is caused by the recordings to vary therefrom. Assuming that the spot EF is moved by the lantern 88 from the circle 101 upwardly along the line 105, the spot will be viewed by the cell 116. The cells of the camera 108 will not view the spot as long as it remains on the line 105 since the focal image thereof falls in alignment with the partition 114. The cell 116 when activated by the spot EF energizes the solenoid 128 to impose a force upon the stick 126 in the proper direction to cause the mirror 104 to effect the return of the spot EF toward the circle 101. Should the spot EF be moved into the upper left-hand quadrant of the area 102, as shown in Fig. 12, the cells 116 and 118 will both view the spot to energize the solenoids 128 and 130 to so maneuver the controls and the mirrors associated therewith as to return the spot to the circle 101. It will thus be apparent that for any movement of the spot EF from the circle 101, it will be viewed by certain of the photoelectric cells to impose forces upon the proper controls to effect the return of the spot to the circle. If desired, the circuits may be arranged so that the forces tend to act in directions opposite to that described above. Rheostats may also be included in the circuits to vary the intensity of the forces. The projection of the spots EF and G can also be removed from view of the student during advanced instruction, and if desired, caused to act upon metering devices. It should also be recognized that some of the instrument readings may continue to increase or decrease while others may remain the same after the actuation of a control. These relationships between the instruments and controls may easily be perceived by the student by use of the spots EF and G. While the spots associated with the instruments indicated on the screen 100 are not normally affected by operation of the controls, suitable mirrors may be provided for such control, if desired.

Means similar to the cells 115 to 118 may be provided to view the spot G for automatically imposing force upon the aileron conection of the stick 126 for the purpose of instructing the student in the manipulation of the stick for aileron control.

Devices similar to the cells 115 to 118 may be provided for response to spots other than the spots recording the position of the controls. That is, they may be arranged, for instance, for response to the projection of spots which record the forces acting upon the controls, so as to function in coordination with the main projections. A still further use of the apparatus may be effected by the use of a lantern located in respect to the mirrors 103 and 104 similar to the lantern 88 but on the order of the lantern 1 in Fig. 1. The beam of light from such a lantern being controlled by the rudder bar and the stick may be caused, by manipulation of the rudder bar and stick, to follow and coincide with the spot EF projected on the same screen by the lantern 88. A student may thus practice the maneuvers by causing the controlled beam to follow the spot projected from a recorded operation by the lantern 88.

This recording may be that of a particular flight or of maneuvers carried out by a particular airplane. Since airplanes have distinct characteristics, it will be apparent that such use of the apparatus of my invention may also be utilized in the ground training of students for the purpose of flying a particular airplane.

The apparatus diagrammatically illustrated in Fig. 12 is also contemplated for use with unpredictable deviating devices, such as shown in Figs. 2 to 7. That is, the lantern 88 and the mirrors 103 and 104 may be provided in association with deviatable devices for unpredictable movement which the cameras 107 and 108 may observe and relay to the student for instruction in control manipulation.

While my invention has been illustrated and described in connection with the training of airplane pilots, it should be recognized that it is readily adaptable for use in the training of operators of various devices which require in their normal operation or in desired operations continued coordination of a plurality of controls. It will also be readily apparent to those skilled in the art that many changes may be made in the construction, arrangement and use of the embodiments illustrated and described. For example, a cockpit for the student may be supported for movement about its longitudinal, transversal and normal axes, and the responsiveness of the photoelectric cells of the cameras 107 and 108 used to act upon the controls which in turn effect a movement of the cockpit similar to an airplane in actual flight. The cockpit thus supported may also be connected for operation in response to several unpredictable variating devices, such as those illustrated in Figs. 2 to 8, the student being required to right same by manipulation of the controls.

The projection may also be performed by cinematographic method. It should also be apparent that two variating devices may be associated with a single miror giving it the summation of two influences instead of a single influence. For these reasons it is to be understood that the forms of the invention herein illustrated and described are to be regarded as illustrative of the invention only and not as limiting the scope of the appended claims.

I claim:

1. Apparatus for instructing and training student operators in the art of manipulating a plurality of coordinatable controls of a device requiring for desired operation the coordinated operation of a plurality of controls and which tends to a state of undesired operation unless said controls are continuously monitored, which comprises means for simulating the condition of the device to be controlled, means for effecting changes in the simulated condition of said device, and means operatively associated therewith to convey information to the student in synchronism with the changes in the condition of said device to indicate to the student the proper coordinated manipulations of said controls for bringing said device into a state of control conforming to that required for correct operation according to each change in the condition of said device.

2. Apparatus for use in instructing and training student operators in the art of manipulating a plurality of coordinatable controls of a device which tends to pass into a state of undesired operation unless the controls thereof are continuously monitored, which comprises movable means for simulating the condition of the device to be controlled, means for effecting movement of said movable means to indicate to the student a condition requiring coordinated manipulation of said controls to bring said movable means into a state of control conforming to that required for correct operation, means arranged to operate in synchronism with said movable means for applying forces to said controls to urge their movement in such direction as to indicate to the student the proper manipulations for effecting operations to reestablish a desired condition, and means for varying said forces in accordance to the stage of instruction of the student.

3. Apparatus for use in instructing and training student operators in the art of manipulating a plurality of coordinatable controls of a device which tends to pass into a state of undesired operation unless the controls thereof are continuously monitored, which comprises a plurality of coordinatable controls similar to those used in actual operation of said device, means for simulating changing conditions of said device requiring coordinated manipulation of said controls to bring the device into a state of control conforming to that required for correct operation according to said simulated conditions, means for conveying information to the student in synchronism with the changing conditions to indicate to him the proper manipulations of the controls, and means operating in synchronism with and responsive to the student's manipulations of said controls for indicating to the student the correctness of his manipulations to said controls.

4. Apparatus for use in instructing and training student operators in the art of manipulating controls of a device which tends to pass into a state of undesired operation unless the controls thereof are continuously monitored, which comprises a plurality of controls similar to those used in actual operation of said device, means for producing images movable in a given field to simulate the indications of instruments normally associated with said device, means for effecting movement of the images to simulate change of instrument indications in accordance with a determined operation or series of operations, and means operating in synchronism with the movement of said images to convey information to the student to indicate to him the proper manipulations of the controls in accordance to the simulated changing instrument indications, and means operating in synchronism with the student's manipulations of said controls to indicate to him the correctness of such manipulations.

5. Apparatus for use in instructing and training student operators in the art of manipulating controls of a device which tends to pass into a state of undesired operation unless the controls thereof are continuously monitored, which comprises a plurality of controls similar to those used in actual operation of said device, means for producing a movable representation indicating the condition of the device for operation of which the student is to be trained, means for effecting movement of the representation to indicate various conditions of said device, means including audible recordings adapted to be operated in synchronism with the movements of said representation to instruct the student to make the correct manipulations of said controls in accordance with the movements of said representation.

6. Apparatus for instructing and training student pilots in the art of manipulating the controls of an airplane, which comprises means for producing a representation of a landscape as normally viewed by a pilot during flight, means for effecting changes in said representation to indicate a state of disturbed flight, a set of controls corresponding to those used in piloting an airplane, and means operatively connected to said change-effecting means and operating in synchronism therewith for applying forces to the controls in directions depending upon the changes in said representation to indicate to the student the proper manipulations for effecting stabilized flight, and said controls being freely manipulable by a student independently of the suggesting forces applied thereto.

7. Apparatus for use in instructing and training student operators in the art of manipulating the controls of a device requiring for desired operation the coordinated control of a plurality of controls and which tends to pass into a state of undesired operation unless said controls are continuously monitored, such for example as the stick and rudder bar of an airplane for coordinated control of the elevator, ailerons and rudder thereof, which comprises a plurality of controls similar to those used in actual operation of said device, means for producing an image simulating movement of the device away from a state of desired operation, means responsive to movements of said image in simulation of the movement of said device away from a state of desired operation and operating in synchronism therewith for applying forces to the controls suggestive of the proper manipulation for effecting a return of the device to the state of desired operation, said controls being manipulatable by the student regardless of said forces, and means for causing movement of the image in accordance with the manipulation of the controls.

8. In apparatus for instructing and training student operators in the art of manipulating the controls of a machine requiring for desired operation the coordinated operation of a plurality of controls and which tends to a state of undesired operation unless said controls are continuously monitored, the combination of means for providing an image simulating the machine, devices arranged to cause the image to assume positions indicating different conditions of the machine, means operable in accordance to movement of the image from a given position to apply forces to the controls in directions to indicate to the student the proper manipulation, and means responsive to manipulation of said controls for effecting change in the position of said image.

9. In apparatus for instructing and training student operators in the art of manipulating the controls of an airplane, the combination of means including a plurality of projection elements for projecting upon a screen an image simulating a condition of an airplane in flight, means for effecting movement of said elements to cause the image to have various movements corresponding to different maneuvers of the airplane, and means operable in response to manipulation of the controls for effecting the return of said image toward a desired position.

10. In apparatus for instructing and training student operators in the art of manipulating the controls of an airplane, the combination of means including a plurality of projection elements for projecting upon a screen an image simulating a condition of an airplane in flight, and means operatively associated with one or more of said projection elements tending to continuously deviate from a given position to disturb the position of the elements and cause the image to have various movements corresponding to different maneuvers of the airplane.

11. Apparatus for instructing and training student operators in the art of manipulating the controls of a device requiring for desired operation the coordinated operation of a plurality of controls and which tends to a state of undesired operation unless said controls are continuously monitored, which comprises means including a plurality of elements for projecting and controlling the projection of an image upon a screen, means operatively associated with at least one of said elements adapted to continuously deviate from a position of normal control to positions adapted to disturb the positions of said elements and cause said image to move and simulate different conditions of said device, means responsive to manipulation of the controls to the effect return of said deviatable means toward normal controlling position, and means for varying the rate of movement of said deviatable means in accordance to the relation of the control to the position of the deviatable means.

12. In apparatus for instructing and training student operators in the art of manipulating the controls of an operable means, the combination of means including a plurality of projection elements for projecting upon a screen an image simulating operative conditions of said operable means, means operatively associated with one or more of said projection elements adapted to continuously deviate from neutral position to disturb the position of said elements and cause the image to have various movements corresponding to different operations of the operable means, means for regulating the rate of movement of the deviatable means toward and away from neutral position, and means operatively associated with said regulating means and responsive to manipulation of the controls for determining the character and rate of movement of the image.

13. In apparatus for instructing and training student operators in the art of manipulating the controls of a device requiring for desired operation the coordinated operation of a plurality of controls and which tends to a state of undesired operation unless said controls are continuously monitored, the combination of projection means, means associated with said projection means for projecting images upon a screen for perception by the student, said images simulating the continuous readings of various instruments normally associated with said device for a determined operation, and means for conveying signals to the student of the proper control manipulations to be performed in accordance to different instrument indications.

14. In apparatus for instructing and training student operators in the art of manipulating the controls of a self-propelled device requiring for desired operation the coordinated operation of a plurality of controls and which tends to a state of undesired operation unless said controls are continuously monitored, the combination of projection means, means for associating a film having recorded indications of the instrument readings of instruments normally associated with the device with said projection means for projection upon a screen, said recorded indications representing a maneuver or operation of the device, means for indicating upon the screen the manipulation of the controls, and means responsive to the projected indications for showing the student the proper control manipulations to effect the operation which produced the instrument readings.

15. In apparatus for instructing and training student operators in the art of manipulating the controls of a device requiring for desired operation the coordinated operation of a plurality of controls and which tends to a state of undesired operation unless said controls are continuously monitored, the combination of means for projecting a spot upon a screen to indicate a particular operation, means including photoelectric cells for observing the area of the screen, and means controlled by the cells for imposing forces upon the controls in accordance with the position of the spot.

16. In apparatus of the type disclosed comprising a screen, means for projecting a light upon the screen to indicate the operating condition of a device requiring for desired operation the coordinated operation of a plurality of controls and which tends to a state of undesired operation unless said controls are continuously monitored, and means including photoelectric cells adapted to observe the screen and control the operation of the device in accordance with the condition indicated by the light.

17. Apparatus for use in instructing and training student operators in the art of manipulating a plurality of coordinatable controls of a device which tends to pass into a state of undesired operation unless the coordinated controls thereof are continuously monitored, which comprises means for simulating the visual condition of said device in various conditions of operation, means for effecting changes in the simulated visual condition of said device, means including audible recordings for simulating the audible condition of said device under varying conditions of operation, and means for operating said audible recordings in synchronism with changes in the simulated visual condition of said device.

18. Apparatus for use in instructing and training student operators in the art of manipulating controls of a device which tends to pass into a state of undesired operation unless the controls thereof are continuously monitored, which comprises a plurality of coordinatable controls similar to those used in actual operation of the device, means for simulating a perceptible condition of said device in operation, means for effecting changes in the simulated condition of said device, and means for imposing forces on said controls in accordance to and in synchronism with changes in the simulated condition to indicate to the student the actual imposition of forces normally experienced on the controls for such condition of such means.

19. Apparatus for instructing and training student operators in the art of manipulating a plurality of coordinatable controls of a device which tends to pass into a state of undesired operation unless the controls thereof are continuously monitored, which comprises a plurality of coordinatable controls of the type used in actual operation of said device, said controls being manipulated at will by the student, means for simulating conditions requiring coordinated manipulation of said controls to bring said device into a state of control conforming to that required for correct operation according to said simulated conditions, and signalling means for conveying information to the student in synchronism with changes in the simulated conditions to indicate the proper control manipulations of said device.

20. Apparatus for instructing and training student operators in the art of manipulating a plurality of coordinatable controls, of a device which tends to pass into a state of undesired operation unless the controls thereof are continuously monitored, which comprises a plurality of coordinatable controls of the type used in actual operation of said device, said controls being manipulatable at will by the student, means for simulating conditions requiring coordinated manipulation of said controls to bring said device into a state of control conforming to that required for correct operation according to said simulated conditions, signalling means for conveying information to the student in synchronism with changes in the simulated conditons to indicate the proper control manipulations of said device, and means operable in response to the students manipulations to indicate the degree of correlation of the students manipulations to the correct manipulations indicated by said signalling means.

21. Apparatus for instructing and training student operators in the art of manipulating a plurality of coordinatable controls of a device which tends to pass into a state of undesired operation unless the controls thereof are continuously monitored, which comprises a plurality of coordinatable controls similar to those used in actual operation of said device to be controlled, said controls being manipulatable at will by the student, means for simulating conditions requiring coordinated manipulation of said controls to bring said device into a state of control conforming to that required for correct operation according to said simulated conditions and means for applying suggestive forces in synchonism with changes in the simulated conditions to urge movement of the controls to indicate to the student the proper manipulation.

22. Apparatus for instructing and training student operators in the art of manipulating a plurality of coordinatable controls of a device which tends to pass into a state of undesired operation unless the controls thereof are continuously monitored, which comprises a plurality of coordinatable controls similar to those used in actual operation of said device to be controlled, said controls being manipulatable at will by the student, means for simulating conditions requiring coordinated manipulation of said controls to bring said device into a state of control conforming to that required for correct operation according to said simulated conditions, means for applying suggestive forces in synchonism with changes in the simulated conditions to urge movement of the controls to indicate to the student the proper manipulation, and means operable in response to the students manipulations to indicate the correctness of his manipulations.

23. Apparatus for instructing and training student operators in the art of manipulating a plurality of coordinatable controls of a device which tends to pass into a state of undesired operation unless the controls thereof are continuously monitored, which comprises a plurality of coordinatable controls similar to those used in actual operation of said device to be controlled, said controls being manipulatable at will by the student, means for simulating conditions requiring coordinated manipulation of said controls to bring said device into a state of control conforming to that required for correct operation according to said simulated conditions, means for applying suggestive forces in synchronism with changes in the simulated conditions to urge movement of the controls to indicate to the student the proper manipulation, and means for varying the intensity of said suggestive forces in accordance to the stage of instruction.

24. Apparatus for instructing and training student operators in the art of manipulating a plurality of coordinatable controls of a device which tends to pass into a state of undesired operation unless the controls thereof are continuously monitored, which comprises a plurality of coordinatable controls of the type used in actual operation of said device, means for simulating conditions requiring manipulation of said controls, a plurality of movable images each corresponding to one of the controls and operable to indicate to the student the proper disposition of the control, means for effecting movement of the images in synchronism with changes in the simulated conditions to indicate the proper control manipulations, and additional images each corresponding to one of the first mentioned images and movable in response to control manipulations to indicate the correctness of the student's manipulations.

25. Apparatus for instructing and training student operators in the art of manipulating the controls of a device which tends to pass into a state of undesired operation unless the controls thereof are continuously monitored, which comprises a control, a film having recorded indications of control manipulation for a given maneuver, means for projecting the recordings of the film on a screen, means including photoelectric cells for observing the screen, and means controlled by the cells for imposing forces upon the control in accordance with the recorded projection to teach the student the proper control manipulation for effecting said maneuver.

26. The apparatus as defined in claim 25, in which the film is provided with audible recordings concerning the maneuver and means for reproducing the audible recordings in synchronism with the projections.

27. Apparatus for instructing and training student operators in the art of manipulating the controls of an airplane, which comprises means adapted to project upon a screen an image of size and character as to be capable of assuming different orientations on said screen representative of the flight conditions of the airplane, and a plurality of elements operable to vary the appearance of the projected image, means responsive to manipulation of said controls for influencing the operation of said elements, means operable independent of the controls for influencing the operation of said elements, one of the elements being operable to cause rotation of the projected image to simulate the effect of aileron control manipulation, another of the elements being operable to effect vertical movement of the projected image to simulate elevator control manipulation and a third element operable to effect horizontal movement of the projected image to simulate the effect of rudder control manipulation.

28. Apparatus for instructing and training student operators in the art of manipulating the controls of a device which tends to pass into a state of undesired operation unless the controls thereof are continuously monitored, which comprises means for projecting an image of a diapositive upon a screen, means operable to rotatably support the diapositive to effect rotation of the image, a reflector movable about a horizontal axis arranged to intercept the projection to produce vertical movement of the image, and a second reflector movable about a different axis arranged to intercept the projection to produce horizontal movement of the image.

29. Apparatus for instructing and training student operators in the art of manipulating the controls of a device which tends to pass into a state of undesired operation unless the controls thereof are continuously monitored, which comprises means for projecting an image of a diapositive upon a screen, means operable to rotatably support the diapositive to cause rotation of the image, and operable means for intercepting and reflecting the projection to effect rectilinear movements of the image.

30. Apparatus for instructing and training student operators in the art of manipulating controls of means such as an airplane, which comprises means for projecting an image upon a screen to represent the condition of the means to be controlled, means associated with the projection means tending to effect unpredictable movement of the image from a given position, means responsive to manipulation of the control from a neutral position to effect the operation of said associated means and thereby the position of the projected image, and the coactive relation of the control with respect to the unpredictable means being such that the neutral position of the control changes as the position of the image changes.

WSEVOLODE GRUNBERG.